US012045773B2

(12) United States Patent
Chila et al.

(10) Patent No.: US 12,045,773 B2
(45) Date of Patent: Jul. 23, 2024

(54) INVENTORY SYSTEM AND METHODS OF USING THE SAME

(71) Applicant: Ethicon, Inc., Somerville, NJ (US)

(72) Inventors: Matthew Chila, Doylestown, PA (US); Jonathan Addeo Syby, Manasquan, NJ (US); Allen Keith On, Flemington, NJ (US); David Mickle Wade, Boca Raton, FL (US); Matteo Josue Piedra, Gladstone, NJ (US); Lewis Arthur Lau, Millington, NJ (US)

(73) Assignee: Ethicon, Inc., Raritan, NJ (US)

( * ) Notice: Subject to any disclaimer, the term of this patent is extended or adjusted under 35 U.S.C. 154(b) by 491 days.

(21) Appl. No.: 17/328,223

(22) Filed: May 24, 2021

(65) Prior Publication Data
US 2021/0374658 A1    Dec. 2, 2021

Related U.S. Application Data

(60) Provisional application No. 63/032,029, filed on May 29, 2020.

(51) Int. Cl.
*A61J 7/04* (2006.01)
*G06Q 10/087* (2023.01)

(52) U.S. Cl.
CPC .......... *G06Q 10/087* (2013.01); *A61J 7/0418* (2015.05); *A61J 7/0454* (2015.05); *A61J 2200/70* (2013.01); *A61J 2205/10* (2013.01); *A61J 2205/60* (2013.01)

(58) Field of Classification Search
CPC .................................................. A61J 7/0418
USPC ................................................... 221/2, 6, 12
See application file for complete search history.

(56) References Cited

U.S. PATENT DOCUMENTS

| 10,318,917 | B1 | 6/2019 | Goldstein et al. | |
| 2001/0008984 | A1* | 7/2001 | Omura | G07F 17/0092 700/242 |
| 2002/0032582 | A1* | 3/2002 | Feeney, Jr. | G07F 17/0092 700/231 |

(Continued)

OTHER PUBLICATIONS

International Search Report and Written Opinion dated Aug. 17, 2021 received in International Application No. PCT/IB2021/054487.

*Primary Examiner* — Gene O Crawford
*Assistant Examiner* — Ayodeji T Ojofeitimi

(57) ABSTRACT

The present disclosure is directed to a dispenser that includes a receiving opening configured to receive a plurality of medical products into a cavity of the dispenser as an available inventory, wherein each of the plurality of medical products includes an identifier; a plurality of holders in the cavity, each of the plurality of holders configured to store at least one of the plurality of medical products in a fixed location that is associated with the one of the plurality of medical products, and each of the plurality of holders including a dispensing opening; at least two emitters and at least two sensors around a periphery of the receiving opening, wherein the at least two emitters and the at least two sensors are arranged around a periphery of the receiving opening on a plane that is substantially perpendicular to the plurality of dispensing openings; a processor; and a electronic storage device.

17 Claims, 7 Drawing Sheets
(5 of 7 Drawing Sheet(s) Filed in Color)

(56) References Cited

U.S. PATENT DOCUMENTS

| | | | |
|---|---|---|---|
| 2008/0011765 A1* | 1/2008 | Marquez | G07F 11/16 221/12 |
| 2011/0015781 A1* | 1/2011 | Vardaro | B65D 83/0418 700/231 |
| 2011/0054668 A1 | 3/2011 | Holmes et al. | |
| 2011/0187549 A1* | 8/2011 | Balasingam | A61J 7/0481 340/687 |
| 2012/0298688 A1* | 11/2012 | Stiernagle | G06Q 20/18 221/155 |
| 2014/0043162 A1* | 2/2014 | Siciliano | G07F 9/026 340/568.8 |
| 2014/0222196 A1* | 8/2014 | Michael | A47B 88/994 700/242 |
| 2018/0305123 A1 | 10/2018 | Lert, Jr. et al. | |

\* cited by examiner

INVENTORY SYSTEM AND METHODS OF USING THE SAME

CROSS REFERENCE TO RELATED APPLICATIONS

This application claims the benefit of and priority to U.S. Provisional Application Ser. No. 63/032,029 filed May 29, 2020, the contents of which are incorporated herein by reference.

BACKGROUND OF THE DISCLOSURE

The present disclosure relates to dispensing and inventorying of medical products, and more particularly to systems to dispense medical products, re-stock medical products, and track and control an inventory of medical products in various medical locations, such as hospitals, clinics, outpatient surgical centers, or any other location that dispenses various medical products for use during medical procedures.

In a typical hospital, many medical products are stored in a storage area, such as a closet or storage room. As one example, the storage and use of sutures is discussed. Typically, a hospital stores hundreds of different types of sutures on racks, in cabinets or in suture storage rooms. In this typical hospital, for any given surgical procedure, a surgeon will often have what is commonly referred to as a surgeon "preference card" that specifies what products (including the types of sutures) the surgeon expects to use for that procedure, and how many of each. These sutures and supplies are obtained by the circulating nurse or other hospital staff and made available and ready to use in the surgical theater.

In current practice, surgeon preference cards are manually kept, and still often exist in physical card format as opposed to electronically. They are not updated regularly, and not updated each time a surgical procedure is performed to more accurately reflect what was actually used versus what was requested for that surgery. Thus, any errors and inefficiencies in supply are repeated over and over again for a given surgeon each time he/she performs surgery. Further, the hospital has no way of tracking these errors and inefficiencies at all, let alone relative to a particular surgeon. Preference card change management is not solely owned by the surgeon, nursing or materials management. Therefore, it leads to unsuccessful change management and remediation of surgeon preference cards. Service providers have built businesses on the remediation of surgeon preference cards, but their services are expensive and not done on a consistent basis. Procedural standardization of surgical products is a growing trend in healthcare to control costs.

Additionally, there are situations where an additional medical product, a product that is not listed on the preference card, becomes needed just prior to a surgical procedure, during a surgical procedure, or right after a surgical procedure. In these situations, little or no record keeping exists for any use of these additional medical products and the urge to obtain more than what is reasonably expected for use is present, since further trips to a storage area are time and energy consuming. This creates further inefficiencies in a hospital's inventory management system and creates further instances of waste.

These typical systems lead to waste of sutures due to improper disposal or lack of restocking, and a higher incidence of product loss due to products passing their expiration dates. This typical system also does not track who is actually removing what type of suture or quantity of sutures from the storage closet, or if any unused sutures are actually ever restocked.

Further, storage of sutures within a typical hospital leads to waste. Because hospitals typically do not have a system to accurately and timely keep track of inventory, often either too many sutures are stored-leading to waste due to expiration of those sutures, or too few sutures are stored-leading to use of alternative sutures which may not be optimal for the specific procedure.

Also, management of inventory is a manual, time-consuming process, which typically includes a lag time of several days to account for shipping times, actual time for a person to manually restock, etc. Nurses and materials management staff usually split the responsibility of managing surgical product inventory. It is estimated that it takes hospital staff over 20 hours a week to manage suture products in the hospital. In 2016, the Association of Perioperative Registered Nurses reported that the national average base compensation was $70,300. Therefore, it is estimated that it costs hospital employers over $35,000 to have their operating room nurses manage their suture inventory.

Although the examples discussed above refer to sutures, any medical product can be included in as these typical examples.

Manual and automated dispensing machines are known and utilized for dispensing a wide variety of items ranging from snacks and hot meals to health-related items such as certain over-the-counter medications. The vast majority of these dispensing machines are vending machines that are utilized as point of sale devices. While dispensing and vending machines are utilized in many areas, they are not widely used in the health care market.

In the field of surgery, for example, surgeons and other medical professionals rely on access to rooms of inventory having boxes of inventory manually stocked by themselves and sales representatives of the medical product manufacturers. These rooms require manual inventory control and simply hold the medical product. Also, these rooms may be a large distance from where a surgical procedure takes place, making the gathering of additional medical products not listed on a preference card difficult.

There is a need to develop an improved system for storing and maintaining the current inventory of medical products. Typically, different stock keeping units, or SKUs, need to be segregated by attributes such as diameter of suture, length of suture, color of suture, suture material (non-absorbable and absorbable), needle type, etc. As one example, one surgical suture manufacturer, Ethicon, Inc. of Somerville, N.J., has thousands of suture SKUs for various surgical procedures and other medical needs. This could translate to thousands of different suture boxes on the shelves in a larger hospital supply room. Product identification on each of the boxes is relatively small, and must be read carefully to select the appropriate medical products listed on preference card, or to select the appropriate medical products needed in an emergent/urgent situation when a medical product is needed but not included in the products listed on the preference card. Given the manual nature of the current process, there are significant efforts in selection and restocking and inventory tracking. As indicated previously, it is estimated that a typical medium sized hospital may lose tens of thousands of dollars per year due directly to inefficiencies in the system.

As such, a need exists for better system for dispensing and restocking of sutures or other medical devices or supplies, and for otherwise more accurately and efficiently tracking inventory of such products.

Embodiments of the present disclosure provide devices and methods that address the above clinical needs.

SUMMARY OF THE DISCLOSURE

The present disclosure is directed to systems and dispensing systems.

The present disclosure is also directed to a dispenser, the dispenser comprising: a receiving opening configured to receive a plurality of medical products into a cavity of the dispenser as an available inventory, wherein each of the plurality of medical products comprises an identifier; a plurality of holders in the cavity, each of the plurality of holders configured to store at least one of the plurality of medical products in a fixed location that is associated with the one of the plurality of medical products, and each of the plurality of holders comprising a dispensing opening; at least two emitters and at least two sensors around a periphery of the receiving opening, wherein the at least two emitters and the at least two sensors are arranged around a periphery of the receiving opening on a plane that is substantially perpendicular to the plurality of dispensing openings; a processor; a electronic storage device, wherein the electronic storage device is configured to store a location of each of the plurality of holders and each of the plurality of dispensing openings within the dispenser, wherein the processor receives input from the at least two sensors, and wherein the processor is configured to determine if one of the plurality of medical products is moved through one of the dispensing openings to an outside of the cavity.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will be better understood by reference to the following drawings, which are provided as illustrative of certain embodiments of the subject application, and not meant to limit the scope of the present disclosure.

DETAILED DESCRIPTION OF THE DISCLOSURE

Figure 1:
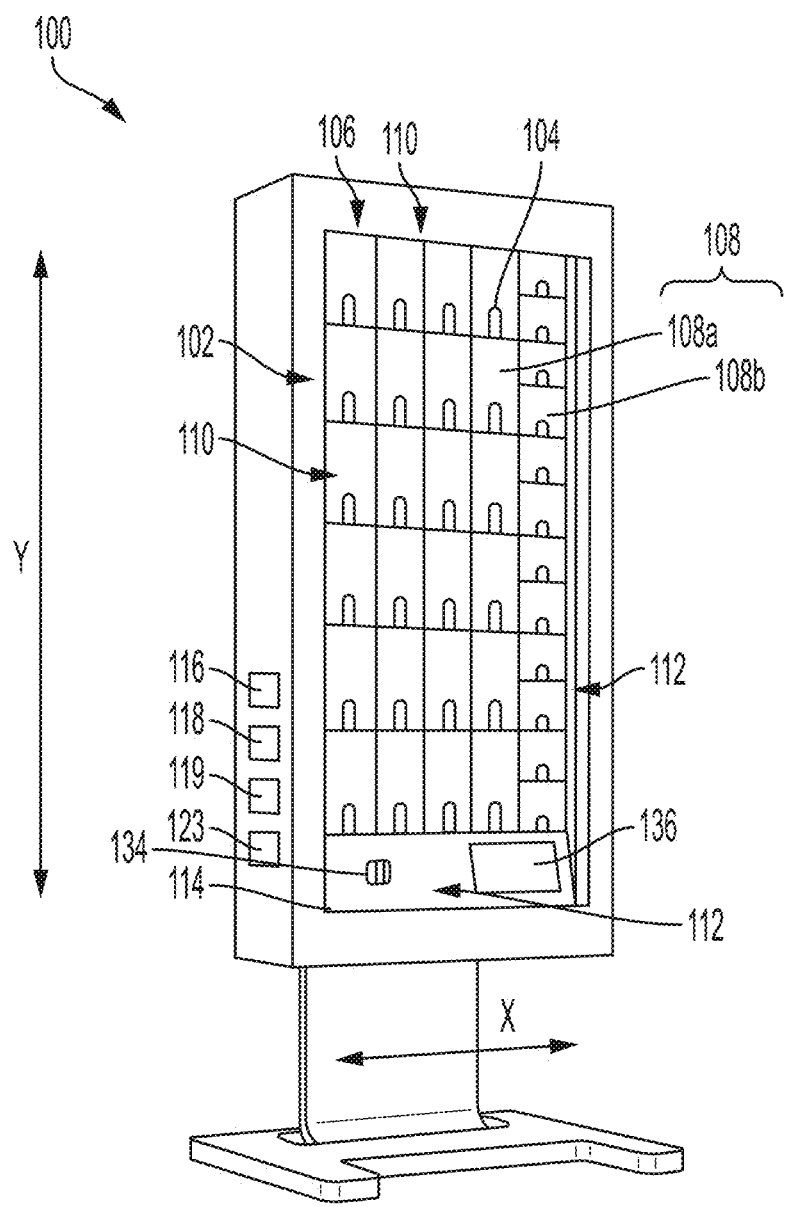
FIG. 1 is a view of a dispenser of a first embodiment.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one embodiment", "certain embodiments", some embodiments" or "an embodiment", indicate that the embodiment(s) described may include a particular feature or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. For purposes of the description hereinafter, the terms "upper", "lower", "right", "left", "vertical", "horizontal", "top", "bottom", and derivatives thereof shall relate to the invention, as it is oriented in the drawing figures. The terms "overlying", "atop", "positioned on" or "positioned atop" means that a first element, is present on a second element, wherein intervening elements interface between the first element and the second element. The term "direct contact" or "attached to" means that a first element, and a second element, are connected without any intermediary element at the interface of the two elements.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

All measurements and/or dimensions shown in the following figures are for exemplary purposes only. In other embodiments, each of these measurements and/or dimensions can be altered in any suitable way. Further, each described component below can be formed of any suitable material, such as plastic including materials, metal including materials, carbon including materials, rubber including materials, glass including materials, etc. and combinations thereof.

As used herein, the term "medical product" refers to products such as sutures, clips, staples, fasteners, implants, hemostats (absorbable), orthopaedic pins, screws, rods, plates, staple reloads, dressings, pacing wires, an endoscope, a clamp, a saw, bone wax, drains, connectors, adapters, tubing, topical skin adhesives, etc. that can be stored in a dispenser. The dispenser is further described below, but can refer to any device that is configured to store one or more medical products, dispense and/or allow access to that medical product, maintain and/or provide an inventory of stored products, and can accept unused medical products back into a storage compartment of the dispenser.

The present disclosure is directed to dispensing systems, and systems for controlling the inventory of various medical products. Although dispensing systems, "dispensing" and "dispense" are discussed in reference to the disclosed devices, the "dispensers" of the present application do not actively move any objects from one place to another, the "dispensers" are directed to providing and/or making available various objects.

One embodiment of one dispenser is shown in FIG. 1. Dispenser 100 includes a receiving opening 102, which is configured to receive a plurality of medical products 104 (shown in more detail in following figures) into a cavity 106 of the dispenser 100. These plurality of medical products 104 are received as available inventory, and each of the plurality of medical products 104 includes an identifier. The identifier can be any suitable identifying element, such as a bar code, a QR code, and/or a Radio Frequency Identification (RFID). Although not shown, a restocking bin or area can be included with the dispenser 100, as a location for receipt of one or more unused medical products. These one or more unused medical products can then be moved from that location by a user.

Also within dispenser 100 is a plurality of holders 108 in the cavity 106, each of the plurality of holders 108 being configured to store at least one of the plurality of medical products 104 in a fixed location. That fixed location is associated with the kind of one of the plurality of medical products 104, and each of the plurality of holders 108 comprising a dispensing opening (shown in more detail in later figures).

Each of the plurality of holders 108 can be the same size, so that the stored at least one medical product 104 is the same size for each holder 108, or the plurality of holders 108 can be varied sizes so that medical products of different sizes can be stored therein.

In FIG. 1, for example, a holder 108a of a first size is shown, and a holder 108b of a second, larger size is also shown. In this embodiment two different sizes of holders 108 are shown, but in other embodiments, all holders 108 can be the same size, or the holders 108 can be three or more different sizes.

Also included in dispenser 100 are at least two emitters 110 and at least two sensors 112 (the figures of this application graphically represent emitters and sensors), which may be placed around a periphery 114 of the receiving opening 102, with this periphery 114 creating the boundaries of an imaginary plane that is substantially perpendicular to the dispensing openings of the holders 108.

As used herein, the emitter 110 refers to any circuit or device that may be used to create an electromagnetic field or emission, e.g., an electric field, magnetic field, light or light energy. An emitter 110 may include one or more combinations of emitters in a single or in separate emitters. As used herein, the term "light" or "light energy" is used generically to refer to electromagnetic radiation, and so the term includes, for example, visible, infrared and ultraviolet radiation. Any suitable type of emitter may be used, but in some embodiments, the emitter is a light-emitting diode (LED). In some embodiments, an emitter emits light at a particular wavelength. In other embodiments, a single emitter may emit light at a first wavelength and a second wavelength, or more than three wavelengths.

As used herein, the "sensor 112" is configured to detect light from one, two or more of the emitters 110, and this detected light generates a signal. Any suitable detector capable of detecting light, such as a photodetector, may be used for sensor 112. Examples of photodetectors include photodiodes, photoconductive cells, photoresistors, phototransistors, light to digital converters, and the like.

The at least two emitters 110 can be placed at any suitable location about the periphery 114, for example a top edge and a left side edge, as shown in FIG. 1. The at least two sensors 112 can be placed at any suitable location about the periphery 114, for example a right side edge and a lower edge, as shown in FIG. 1. In this configuration, both an x-direction (shown as arrow X of FIG. 1) and a y-direction (shown as arrow Y of FIG. 1.) of the dispensing opening of the holder, and a medical product passing there through, can be determined, and will be discussed in more detail below.

The dispenser 100 includes a processor 116 and an electronic storage device 118.

As used herein, the term "processor" may refer to, is part of, or includes circuitry capable of sequentially and automatically carrying out a sequence of arithmetic or logical operations; recording, storing, and/or transferring digital data. The term "processor" may refer to one or more application processors, one or more baseband processors, a physical central processing unit (CPU), a single or multiple-core processor, and/or any other device capable of executing or otherwise operating computer-executable instructions, such as program code, software modules, and/or functional processes.

As used herein, the term "electronic storage device" can include computer system readable media in the form of volatile memory, such as random access memory (RAM) and/or cache memory or others. In some aspects, multiple electronic storage devices may be used. The electronic storage device may be any type of integrated circuit or other storage device adapted for storing data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

The electronic storage device 118 is configured to store a location of each of the plurality of holders 108 within the dispenser 100, and is configured to store the location of each of the plurality of dispensing openings within the dispenser 100.

Figure 2:
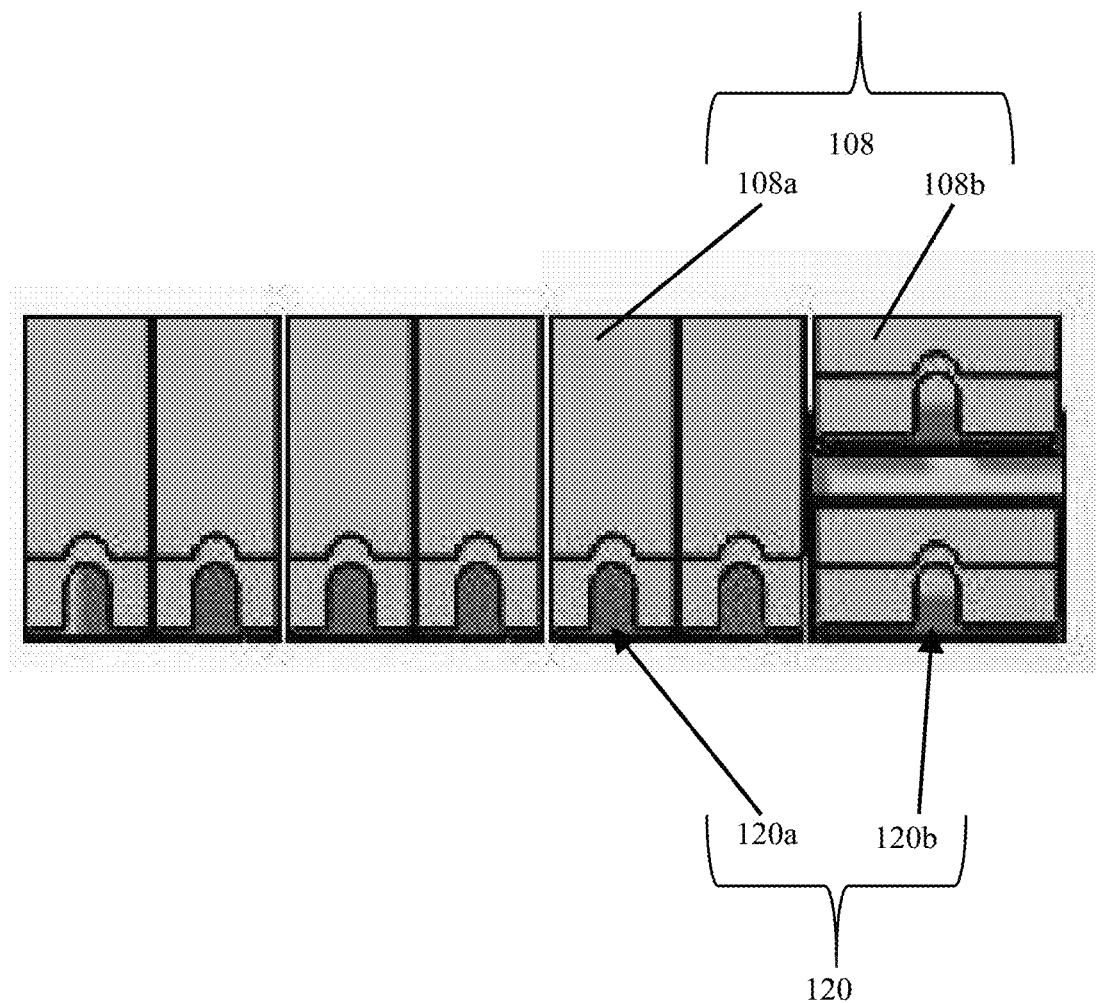
FIG. 2 is a view of a portion of the dispenser.

A magnified view of a row of dispensers 108 is shown in FIG. 2. As can be seen in FIG. 2, each holder 108 includes a dispensing opening 120. Based on the width of the dispenser 108, the dispensing opening 120 will be of a corresponding width, and be of a sufficient width to allow a medical product stored within the holder 108 to be withdrawn through the dispensing opening 120. As an example, a narrower dispensing opening 120 corresponds to a narrower holder 108a, while a wider dispensing opening 120b corresponds to a wider holder 108b.

Figure 3A:
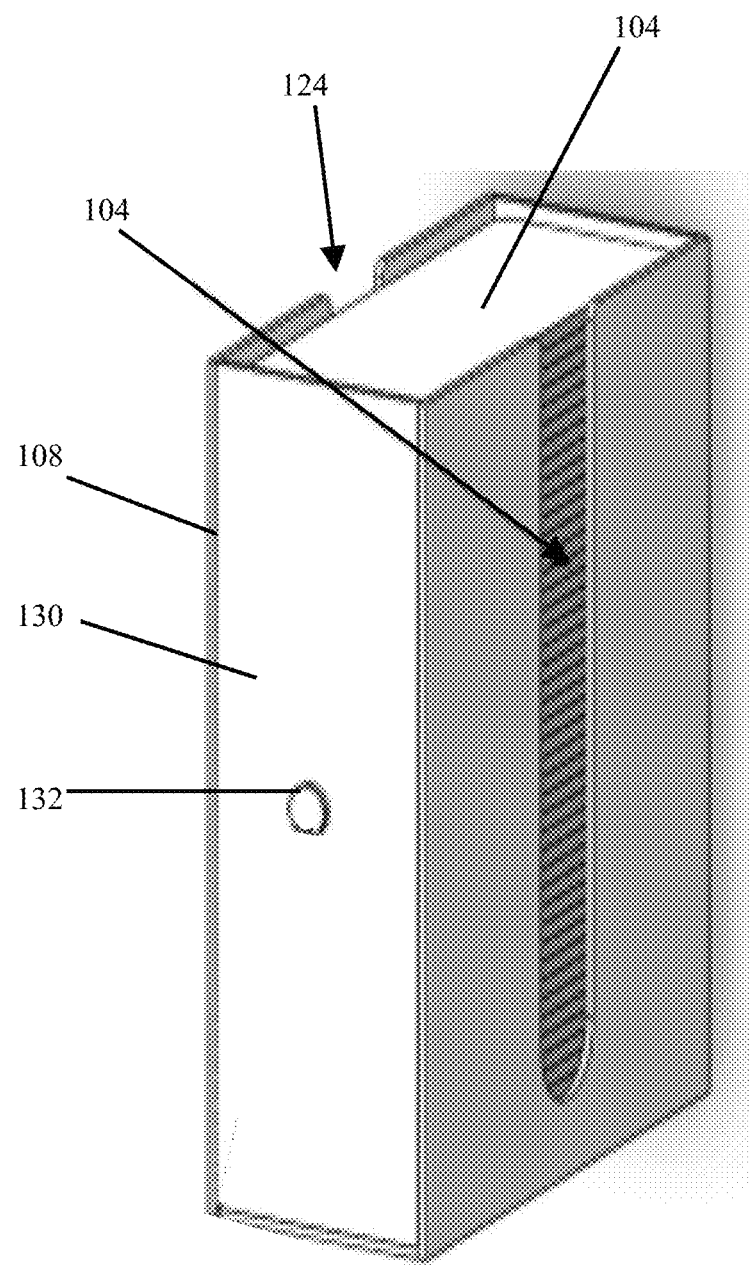
FIGS. 3A and 3B are view of a holder.
Figure 3B:
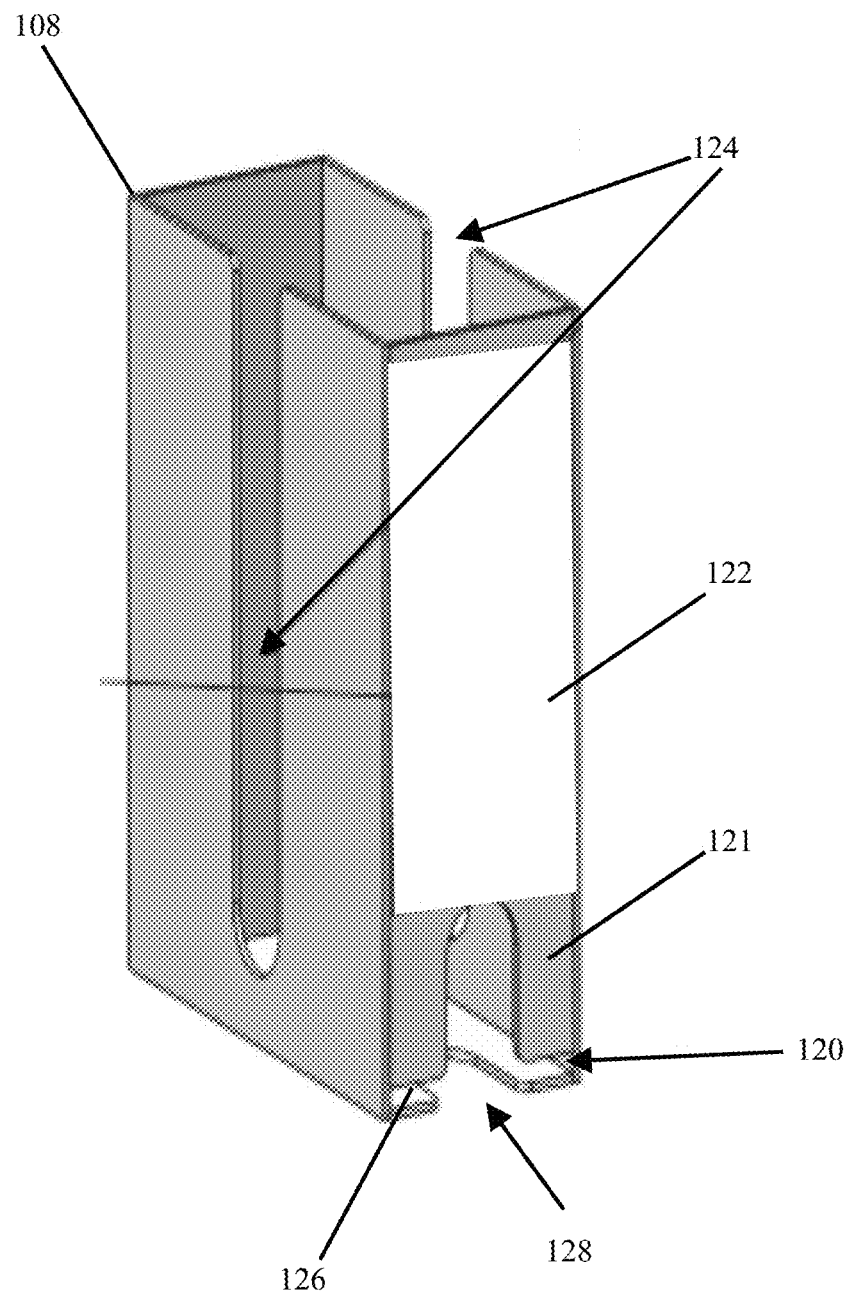

A more detailed look at a holder 108 is shown in FIGS. 3A and 3B.

FIG. 3A illustrates a rear surface 130 of a holder 108, with that rear surface 130 including a mount 132, which can be any suitable structure and/or magnet that is capable of maintaining the holder 108 within the dispenser 100. In this view a plurality of medical products 104 are stored within the holder 108.

FIG. 3B illustrates the front of the holder 108, without any medical products stored within it. A front surface 121 of the holder 108 can include a label 122, or other printed material, that indicates what medical product is, or is supposed to be, stored within the holder 108.

The holder 108 can also include a replenishment groove 124, which can make adding more medical products to the holder easier. Once one or more medical products are added, they are supported by a bottom surface 126, which includes a dispensing groove 128, which extends throughout a portion of the bottom surface 126. This dispensing groove 128 can make removal of medical products, through the dispensing opening 120 easier.

The dimensions of the dispensing opening 120 can be adjusted, in this embodiment, the height of the dispensing opening 120 can allow for removal of a single medical product from the holder 108 at a time. Although not shown, the plane discussed above would be substantially parallel with the front surface 121, so that the front surface 121 and the plane are substantially perpendicular to the dispensing opening 120, and substantially perpendicular to the path a medical product moving through the dispensing opening 120 would take.

In view of FIGS. 1 and 3B, the processor 116 can receive input from the at least two sensors 112, and the processor 116 is configured to determine if one of the plurality of medical products 104 is moved through one of the dispensing openings 120, past the plane (shown in a later figure) to an outside of the cavity 106. The processor 116 can make this determination because, based on the input from the at least two sensors 112, the processor 116 can determine the location of the medical product 104 along both the x axis and the y axis.

Figure 4:
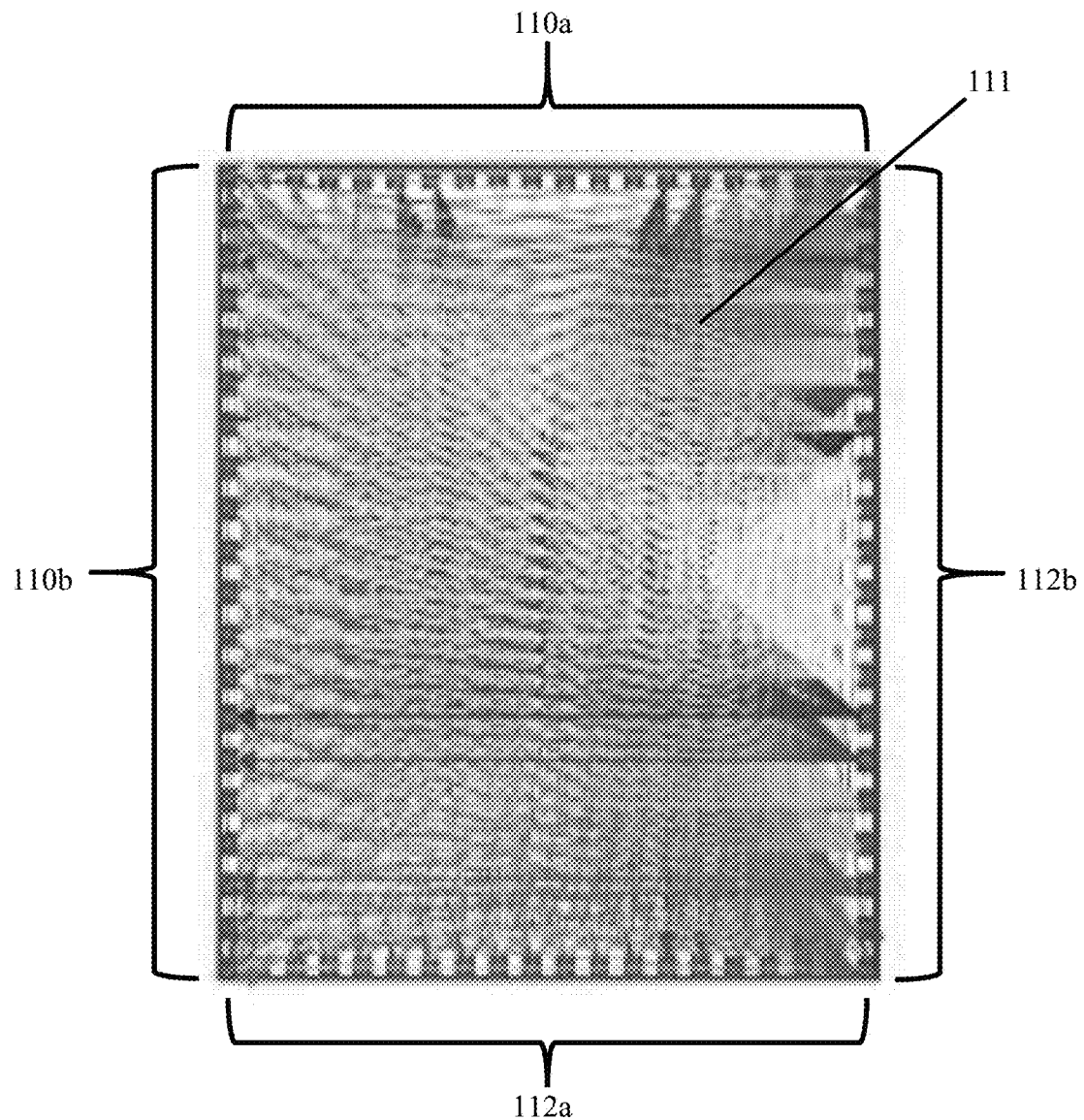
FIG. 4 is a view of a plane formed by emitters and sensors.

A more detailed view of the at least two sensors 112 and the at least two emitters 110 can be seen in FIG. 4, which would be arranged around the periphery of the receiving opening 102, but the dispenser is not illustrated for ease of explanation. In this example, a plurality of emitters 110a are arranged on an upper x axis and a plurality of emitters 110b are arranged on a left side y axis, and a plurality of sensors 112a are arranged on a lower x axis and a plurality of sensors 112b are arranged on a right side y axis.

The plurality of lines produced by the emitters 110 form a plane 111, which was mentioned above. This plane 111 is illustrated in FIG. 4 as many lines being produced from each emitter, extending towards the sensors 112. In this example, one or more of sensors 112a can determine the x-axis location of the dispensing opening as a medical product is moved through the dispensing opening and through plane 111, by detecting the x-axis location of the medical product. In this example, one or more of sensors 112b can determine the y-axis location of the dispensing opening as a medical product is moved through the dispensing opening and through plane 111, by detecting the y-axis location of the medical product. From these inputs, the processor 116 can determine if one of the plurality of medical product is moved to an outside of the cavity, and which dispensing opening that medical product has moved through, thus identifying what that removed medical product is.

For each of emitters 110a, 110b, and sensors 112a, 112b, many devices are shown, but only one emitter or sensor can be present on any single side. Also, the location of the edge the emitters 110a, 110b and sensors 112a, 112b can be different, as long as one emitter 110 is on an x axis edge, and one emitter 110 is on a y axis edge, and as long as one sensor 112 is on an x axis edge, and one sensor 112 is on a y axis edge.

Figure 5:
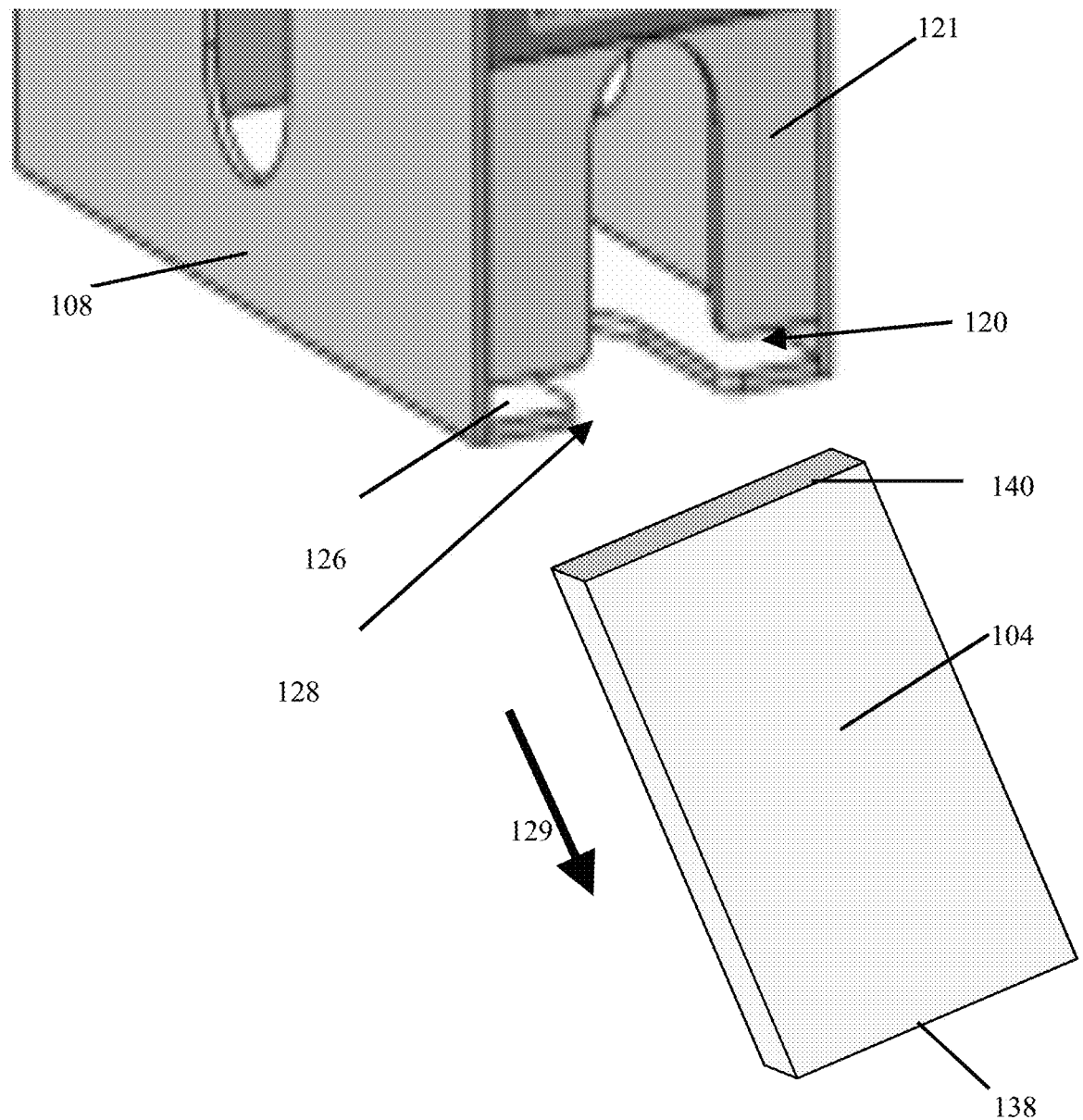
FIG. 5 is a view of a holder and a medical product.

Detection of removal of a medical product by the processor can be in any suitable way. One example, is discussed in reference to FIG. 5, which is a magnified view of FIG. 3B with the addition of a medical product 104. As can be seen in FIG. 5, one medical product 104 of the plurality of medical products has been removed from the holder 108, through the dispensing opening 120, by a user pulling on the medical product 104 in the direction of arrow 129. The medical product has a leading edge 138 and a trailing edge 140. While in the holder 108, the leading edge 138 is closer to the dispensing opening than the trailing edge 140.

From the inputs discussed with regards to FIG. 4, the processor 116 can receive an input from the sensors 112 when the leading edge 138 has moved to and past the plane 111, and/or the processor 116 can receive an input from the sensors 112 when the trailing edge 140 has moved to and past the plane. If only a leading edge 138 is determined as moving to and past the plane 111, the medical product 104 is not considered removed since the medical product 104 was only partially moved through the dispensing opening 120, and likely was pressed back into the holder 108. If the trailing edge 140 is determined as moving to and past the plane 111, the medical product 104 is considered removed and the available inventory can be updated.

From the inputs discussed with regards to FIG. 4, the processor 116 can receive an input from the sensors 112 of the fixed location of where the medical product was removed from. Specifically, an x-coordinate (location on the x-axis) and a y-coordinate (location on the y-axis) can be determined for the trailing edge 140 of the removed medical product 104. From this fixed location, the processor 116 can determine what dispensing opening 120, from which holder 108 the removed medical product was removed from, and what kind of medical product was associated with that holder 108.

The processor 116 can also determine if any object passes through the plane 111 from a side opposite to the holders 108. For example, if a user attempts to place an object, or a medical product back into a holder, the processor 116 can determine that this replacement is occurring and notify the user and/or the database that an attempt to place an object within the dispenser 100 has been made.

Referring again to FIG. 1, to add one or more medical products 104 to the dispenser 100, through a replenishment process, a user carries one or more new medical products to the dispenser 100. The user then moves the new medical product, or a container storing one or more new medical products, to a position that a reader 134 (such as a bar code reader, a QR code reader, a Radio Frequency Identification (RFID) reader, etc.) can read the identifier of the new medical product or container storing one or more new medical products and store within the dispenser 100 relevant information regarding the medical product, such as a Stock Keeping Unit (SKU), the expiration of the medical product, the number of products within the package of medical product, etc. This information can be stored within the dispenser 100 and/or an external database through a communication with the dispenser 100. Communication with the external database can be effected with a second communication interface 119 of the dispenser 100, which can be configured to transmit to a cloud based service and/or database outside the dispenser 100, a signal that identifies the type and quantity of medical products, determined by the reader 134, to add those values to the available inventory of the dispenser 100.

The reader 134 can be on any portion of the dispenser 100 that is accessible by a user, which is also configured to scan the identifier of the new medical product. Alternatively, or in conjunction, the user can interact with a display 136 and manually enter the number and type of new medical product to be added to the dispenser 100.

The dispenser 100 can also include a first communication interface 123. The first communication interface 123 is configured to receive various signals and data, including an available inventory request and a recall request.

If the first communication interface 123 of the dispenser 100 receives an available inventory request, the processor 116 can access the electronic storage device 118 (and/or an external database through a communication with the dispenser 100) and determine the available inventory, which is an updated total of all replenished medical products, minus all medical products removed through dispensing openings. Once the available inventory is determined, the second communication interface 119 of the dispenser 100 is configured to transmit the available inventory, in response to the available inventory request, to a database. This database can be at another location within the same building the dispenser 100 is in, or in a separate location. Further, the first communication interface 123 and second communication interface 119 are configured to receive and transmit information to the database in any suitable way, such as through one or more of a wired internet connection, a wireless internet connection, a cellular connection, a Bluetooth connection, a Near Field Communication connection, etc. The second communication interface 119 can also transmit a signal to subtract a medical product that has been removed from a dispensing opening, shortly after it has been removed, so that the available inventory can be updated. Also, in some embodiments, the first communication interface 123 and the second communication interface 119 are a single device that is configured to receive and transmit, in other embodiments, "first" and "second" communication interfaces can be interchanged.

As part of the available inventory request, the first communication interface 123 may receive data about available inventory in other dispensers in the same location, or other dispensers at locations within a specified distance of dispenser 100. Based on all of this data, the dispenser 100 can determine an aggregated available inventory and transmit that data to a cloud based service and/or database.

The first communication interface 123 can also receive a status request from a cloud based service, at various times, or at specific intervals. Upon receipt of this status request, the second communication interface 119 can transmit back to the cloud based service that the dispenser 100 is operating with a suitable power source (through a connection with a wall socket and/or a battery) and that the dispenser is connected to the internet (through a wired and/or wireless connection).

The first communication interface 123 of the dispenser 100 can also receive a recall request. The recall request is a list of one or more medical products of the plurality of medical products 104 have been recalled due to a manufacturing error, or other known error associated with one or more of the medical products 104. To avoid the possibility that the medical products 104 will be removed for use from the dispenser 100, the display can display a warning that a certain medical product has been recalled, and/or the display can display a warning, upon removal of a medical product that has been recalled, that the just removed medical product has been recalled. In conjunction with this warning, a speaker could also provide an auditory warning.

The display 136 can be a graphical user interface (GUI), and is included on a front surface of the dispenser 100, but, in other embodiments, the display 136 can be in any other suitable location on the dispenser 100. The display 136 is configured to receive an input from a user, receive signals from the electronic storage device 118, and display data. The input received from a user is selected from the group consisting of an input force from a user, an input contact from the user, and/or an input of near physical contact within a predetermined proximity, each of which can be used to make a selection, and/or alter what is being displayed on the display 136.

This data the display 136 is capable of displaying can be selected from the group consisting of a number of each of the plurality of medical products 104 within the dispenser 100, a planogram of the plurality of holders 108 and their associated at least one of the plurality of medical products 104, and which holder 108 is associated with the replenished medical product. The planogram is an illustration of the holders 108 and their associated medical products, so that the user can determine what holder 108 a replenished medical product is to be placed into. Also, the display can indicate which holder 108, for example, by displaying "The medical product just scanned is to be placed in holder 33", for example.

The display 136 can also be configured to receive an input from a user, wherein the input is used to receive a code (such as an access code so that a user can replenish medical products without creating an alarm), and display received video (which can be received from a cloud based service and/or an external database).

The display 136 allows a user to interact with the dispenser 100 in any suitable way. For example, a user can access the display 136 by first scanning an identification card with an ID reader (which can be reader 134) and/or entering a passcode.

The display 136 may also present alternative medical product(s) if there are no more desired medical products within the dispenser 100, and show a comparison between the desired medical product and the possible alternative medical product. Also, the display 136 can be used to order further stock of one or more medical products.

Figure 6:
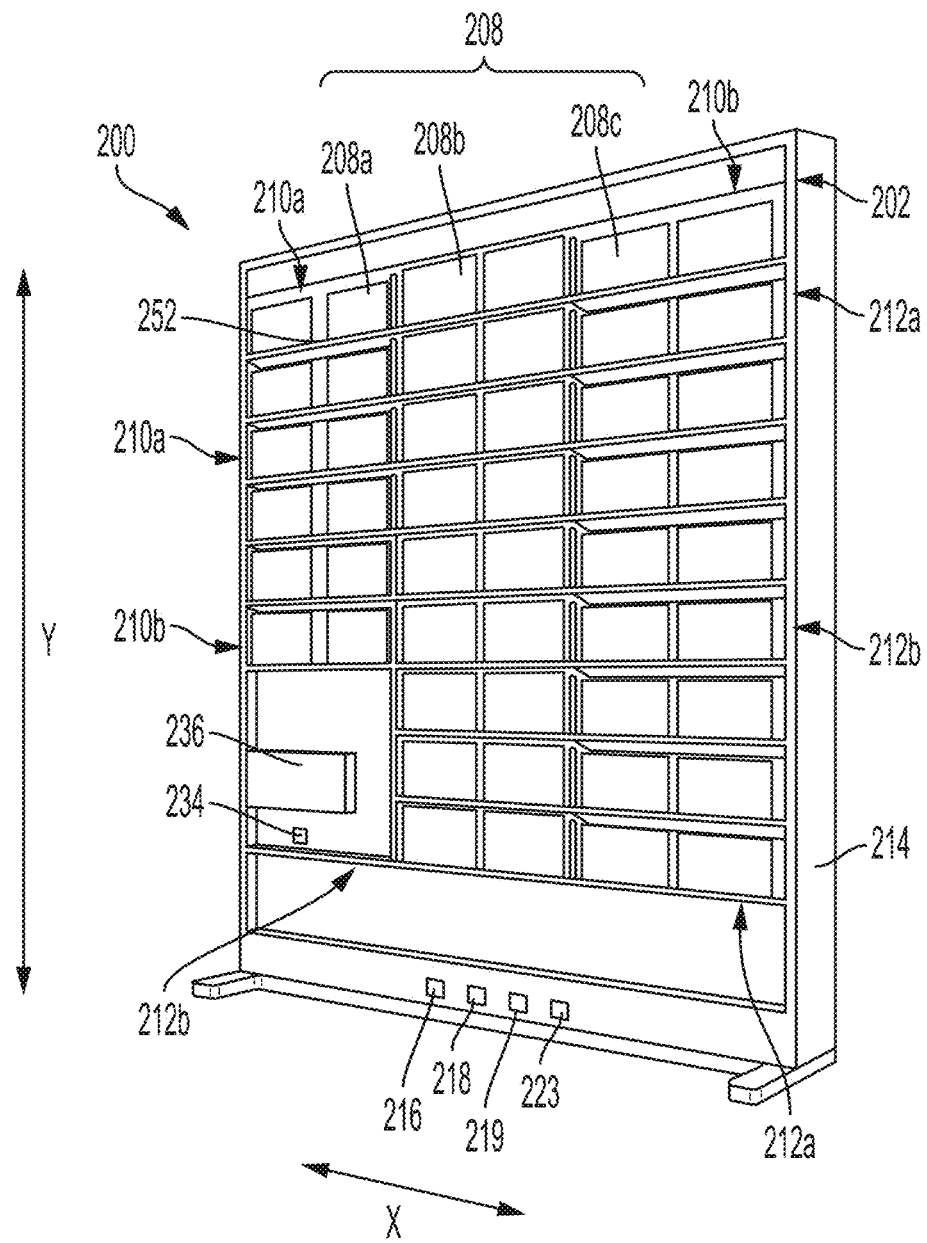
FIG. 6 is a view of a dispenser of a second embodiment.

Another embodiment of a dispenser is shown in FIG. 6. Dispenser 200 can operate in a similar way as dispenser 100. Dispenser 200 can include multiple horizontal shelves 252, which can support holders 208 of various sizes (such as a relative small holder 208a, a medium holder 208b and a relatively large holder 208c). In other embodiments, one size holder 208, two sizes of holders 208, or four or more sizes of holders may be supported by shelves 252.

In this embodiment, dispenser 200 can include a plurality of sets of at least two emitters and at least two sensors. Specifically, a first set of emitters 210a, a second set of emitters 210b, a first set of sensors 212a, and a second set of sensors 212b. The plurality of sets of the at least two emitters (210a, 210b) and the at least two sensors (212a, 212b) are arranged around the periphery of the receiving opening 202 on the plane that is substantially perpendicular to a shelf surface of the horizontal shelves 252.

The emitters of each set of emitters can be placed at any suitable location about the periphery 214, for example along a top edge and a left side edge, as shown in FIG. 5. The sensors of each set of sensors can be placed at any suitable location about the periphery 214, for example a right side edge and a lower edge, as shown in FIG. 5. In this configuration, both an x-direction (shown as arrow X of FIG. 5) and a y-direction (shown as arrow Y of FIG. 5) of the dispensing opening of the holder, and a medical product passing there through, can be determined, as discussed above.

As with dispenser 100, dispenser 200 can include a reader 234 (such as a bar code reader, a QR code reader, a Radio Frequency Identification (RFID) reader, etc.). The reader 234 can be on any portion of the dispenser 200 that is accessible by a user, which is also configured to scan the identifier of the new medical product. Alternatively, or in conjunction, the user can interact with a display 236 and manually enter the number and type of new medical product to be added to the dispenser 200. The display 236 can function and display as display 136 noted above.

The dispenser 200 can also include a processor 216 and a electronic storage device 218.

Information can be stored within the dispenser 200 and/or an external database through a communication with the dispenser 200. Communication with the external database can be effected with a second communication interface 219 of the dispenser 200, which can be configured to transmit to a cloud based service and/or database outside the dispenser 200, a signal that identifies the type and quantity of medical products, determined by the reader 234, to add those values to the available inventory of the dispenser 200.

The second communication interface 219 can also transmit a signal to subtract a medical product that has been removed from the horizontal shelves 252, shortly after it has been removed, so that the available inventory can be updated. If a trailing edge of any medical product on the horizontal shelves 252, is determined as moving to and past the plane, the medical product is considered removed and the available inventory can be updated.

The dispenser 200 can also include a first communication interface 223. The first communication interface 223 is configured to receive various signals and data, including an available inventory request and a recall request. The dispenser may also include an error area if a user realizer there is no location a medical product can be restocked in the dispenser 200, or for any other reason a medical product should not be included in the dispenser, such as it has expired, recalled and/or is damaged.

Alternatively, instead of, or in addition to, including emitters and sensors, dispenser 400 can include a weight sensor between a stored medical product and the horizontal shelf 252. In this embodiment, holders 208 may or may not be included, with any stored medical products being stored either directly on a weight sensor, or in a holder 208 that is supported by a weight sensor.

In this embodiment, the processor 216 can receive a signal that a medical product has been removed from a specific weight sensor. The processor 216 can then determine which medical product was associated to the specific weight sensor through an interaction with the electronic storage device 218 and/or a cloud service. The processor 216 can also, upon determination of what medical product has been removed, update the available inventory.

Similarly, if a medical product is placed into dispenser 200

The processor 216 can determine what the medical product is by its placement on a specific weight sensor, or the processor 216 can determine what the medical product is by determining its specific weight and matching that determined weight to known weights of medical products.

At any time inventory in any of the dispensers discussed above can be transmitted to a database, so that other entities that have access to database can track usage of medical products by the identification of the accessing user, and can track inventory of the dispenser. The database can also transmit, at any time, inventory information to the dispenser that, for example, a medical product has been recalled or is expired. The dispenser could then display such data on the user interface, or an accessing user can be notified of such information.

Although not discussed above, each of the above dispensers can include a temperature monitor and/or a humidity monitor. The dispenser can be configured to record temperatures and humidities within the dispenser at various times, and transmit such recordings to a database.

The phrase "communication interface" includes electronic circuitry, configured for one or more specific standards, that enables one device to telecommunicate (transmit and/or receive) with another device.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

What is claimed is:

1. A dispenser, the dispenser comprising:
   a receiving opening configured to receive a plurality of medical products into a cavity of the dispenser as an available inventory, wherein each of the plurality of medical products comprises an identifier;
   a plurality of holders in the cavity, each of the plurality of holders configured to store at least one of the plurality of medical products in a fixed location that is associated with the one of the plurality of medical products, and each of the plurality of holders comprising a dispensing opening;
   at least two emitters and at least two sensors around a periphery of the receiving opening, wherein the at least two emitters and the at least two sensors are arranged around a periphery of the receiving opening on a plane that is substantially perpendicular to the plurality of dispensing openings;
   a restocking bin configured to receive one or more unused medical products;
   a processor;
   a electronic storage device, wherein
   the electronic storage device is configured to store a location of each of the plurality of holders and each of the plurality of dispensing openings within the dispenser,
   wherein the processor receives input from the at least two sensors, and
   wherein the processor is configured to determine if one of the plurality of medical products is moved through one of the dispensing openings to an outside of the cavity.

2. The dispenser of claim 1, further comprising a reader, the reader configured to read an identifier of a replenished medical product.

3. The dispenser of claim 1, further comprising a second communication interface and a reader, the reader configured to read an identifier of a replenished medical product.

4. The dispenser of claim 3, wherein the processor is further configured to transmit a signal to add the replenished medical product to the available inventory.

5. The dispenser of claim 4, wherein the signal is transmitted to at least one of a electronic storage device and a database.

6. The dispenser of claim 1, further comprising a display configured to receive an input from a user, receive signals from the electronic storage device, and display data selected from the group consisting of a number of each of the plurality of medical products within the dispenser, a planogram of the plurality of holders and their associated at least one of the plurality of medical products, and which holder is associated with the replenished medical product.

7. The dispenser of claim 1, further comprising a first communication interface, the first communication interface configured to receive at least one of an available inventory, an available inventory request and a recall request.

8. The dispenser of claim 1, further comprising a first communication interface and a display, the display configured to receive an input from a user, receive signals from the electronic storage device, and display data selected from the group consisting of a number of each of the plurality of medical products within the dispenser, a planogram of the plurality of holders and their associated at least one of the plurality of medical products, and which holder is associated with the replenished medical product, the first communication interface configured to receive at least one of an available inventory, an available inventory request and a recall request.

9. The dispenser of claim 8, wherein the recall request is a list of one or more medical products of the plurality of medical products, wherein upon receipt of the recall request the dispenser displays a notice on the display.

10. The dispenser of claim 1, further comprising a second communication interface, wherein the second communication interface is configured to transmit the available inventory, in response to the available inventory request, to update a database.

11. The dispenser of claim 10, wherein the processor is further configured to transmit a signal to subtract the removed medical product from the available inventory.

12. The dispenser of claim 11, wherein the signal is transmitted to at least one of a electronic storage device and a database.

13. The dispenser of claim 1, wherein each of the plurality of medical products comprises a leading edge and a trailing edge, the leading edge closer to the dispensing opening than the trailing edge.

14. The dispenser of claim 13, wherein the input received by the processor from the at least two sensors comprises input that the trailing edge of one of the plurality of medical products is moved past the plane.

15. The dispenser of claim 13, wherein the input received by the processor from the at least two sensors comprises input that the fixed location of the trailing edge is at both an x coordinate and a y-coordinate.

16. The dispenser of claim 14, wherein the input received by the processor from the at least two sensors comprises input that the fixed location of the trailing edge is at both an x coordinate and a y-coordinate.

17. The dispenser of claim 1, further comprising a plurality of sets of at least two emitters and at least two sensors, wherein the plurality of sets of the at least two emitters and the at least two sensors are arranged around the periphery of the receiving opening on the plane that is substantially perpendicular to a plurality of shelves.

* * * * *